(12) United States Patent  
Chun et al.

(10) Patent No.: US 8,243,581 B2  
(45) Date of Patent: Aug. 14, 2012

(54) METHOD OF TRANSMITTING CONTROL SIGNAL IN A WIRELESS COMMUNICATION SYSTEM

(75) Inventors: Jin Young Chun, Anyang-si (KR); Bin Chul Ihm, Anyang-si (KR); Moon Il Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 270 days.

(21) Appl. No.: 12/451,048

(22) PCT Filed: Apr. 23, 2008

(86) PCT No.: PCT/KR2008/002299  
§ 371 (c)(1),  
(2), (4) Date: Oct. 23, 2009

(87) PCT Pub. No.: WO2008/130189  
PCT Pub. Date: Oct. 30, 2008

(65) Prior Publication Data  
US 2010/0124195 A1    May 20, 2010

(30) Foreign Application Priority Data

Apr. 24, 2007  (KR) .................. 10-2007-0039902  
Feb. 5, 2008   (KR) .................. 10-2008-0011902

(51) Int. Cl.  
*H04J 11/00*  (2006.01)  
*H04B 7/216* (2006.01)  
(52) U.S. Cl. ........ 370/208; 370/335; 370/479; 375/261; 375/285

(58) Field of Classification Search .......... 370/203–210, 370/329, 335–336, 342, 479, 491, 278, 328, 370/341, 345, 498; 455/450, 509, 24, 126, 455/158.1; 375/261, 233, 284–285  
See application file for complete search history.

(56) References Cited

U.S. PATENT DOCUMENTS

| | | | |
|---|---|---|---|
| 7,586,834 B2 * | 9/2009 | Byun et al. .................. | 370/208 |
| 7,630,356 B2 | 12/2009 | Zhang et al. | |
| 2003/0185242 A1 * | 10/2003 | Lee et al. .................... | 370/491 |
| 2005/0232138 A1 | 10/2005 | Byun et al. | |
| 2005/0286402 A1 | 12/2005 | Byun et al. | |
| 2006/0171295 A1 * | 8/2006 | Ihm et al. .................... | 370/208 |
| 2006/0227888 A1 * | 10/2006 | Khan .......................... | 375/260 |
| 2006/0262870 A1 * | 11/2006 | Khan .......................... | 375/260 |
| 2006/0286996 A1 | 12/2006 | Julian et al. | |
| 2007/0274217 A1 | 11/2007 | Long et al. | |
| 2008/0026744 A1 | 1/2008 | Frederiksen | |
| 2008/0095106 A1 * | 4/2008 | Malladi et al. ............. | 370/329 |
| 2008/0165697 A1 * | 7/2008 | Zeira et al. ................. | 370/252 |

(Continued)

OTHER PUBLICATIONS

KDDI, NTT DoCoM; "CDMA based Multiplexing of ACK/NACK and CQI Control Information in E-UTRA Uplink.", R1-071707, 3GPP TSG RAN WG1 Meeting #48, St. Julians, Malta, Mar. 2007.

(Continued)

*Primary Examiner* — Habte Mered  
(74) *Attorney, Agent, or Firm* — McKenna Long & Aldridge LLP (57) ABSTRACT

A method of transmitting a control signal in wireless communication system includes generating a multiplexed control signal by multiplexing a first control signal and a second control signal, and transmitting the multiplexed control signal on a control channel. Overhead due to control signaling can be reduced by transmitting or receiving a multiplexed control signal through one channel.

13 Claims, 5 Drawing Sheets

U.S. PATENT DOCUMENTS

| | | | |
|---|---|---|---|
| 2008/0219370 A1* | 9/2008 | Onggosanusi et al. | 375/260 |
| 2008/0225792 A1* | 9/2008 | Naguib et al. | 370/330 |
| 2009/0046799 A1* | 2/2009 | Li et al. | 375/267 |
| 2010/0182961 A1* | 7/2010 | Kim et al. | 370/329 |

OTHER PUBLICATIONS

Mitsubishi Electric, "Further Evaluation of CQI feedback scheme.", Tdoc R1-070685, 3GPP TSG RAN WG1 #48. St. Louis, USA, Feb. 2007.

* cited by examiner

METHOD OF TRANSMITTING CONTROL SIGNAL IN A WIRELESS COMMUNICATION SYSTEM

This application claims the benefit of PCT/KR2008/00229 filed on Apr. 23, 2008, 2008 along with Korean Patent Application No. 10-2007-0039902 filed on Apr. 24, 2007 and Korean Patent Application No. 10-2008-0011902 filed on Feb. 5, 2008, each of which are hereby incorporated herein by reference for all purposes in their entirety.

TECHNICAL FIELD

The present invention relates, in general, to wireless communication and, more particularly, to a method of transmitting a control signal in a wireless communication system.

BACKGROUND ART

The next-generation multimedia wireless communication system on which active research has recently been done requires a system that is able to process a variety of data, including video, wireless data, etc. out of the initial voice-oriented service.

The orthogonal frequency division multiplexing (OFDM) scheme is a multi-carrier modulation scheme for transmitting data by dividing the frequency band into a plurality of orthogonal subcarriers and is one of core technologies that have been in the spotlight in the next-generation multimedia wireless communication system. The orthogonal frequency division multiple access (OFDMA) is a scheme providing multiplexing of multi-user by combining OFDM with a frequency division multiple access (FDMA), time division multiple access (TDMA) or code division multiple access (CDMA).

In general, control signals are transmitted from a base station to a mobile station or from a mobile station to a base station periodically or whenever an event occurs. The control signal refers to a signal not including a user signal. Hereinafter, downlink refers to transmission from the base station to the mobile station and uplink refers to transmission from the mobile station to the base station. An example of the uplink control signals includes a channel quality indicator (CQI). In general, the mobile station transmits the CQI to the base station periodically in order to report channel quality to the base station.

The uplink or uplink control signals include a variety of kinds. Further, in order to transfer several control signals, the control signals are frequently exchanged between the base station and the mobile station. This is because one control signal includes only one control information. The exchange of the control signals is called control signaling. Frequent control signaling between a base station and a mobile station may have an effect on an overall capacity of a system. Further, if this control signaling is increased, the lifespan of the battery, that is one of the major design restrictions of a mobile station, is shortened.

The control signaling does not have an influence on the data rate. It is therefore necessary to minimize the control signaling so as to increase the capacity.

DISCLOSURE OF INVENTION

Technical Problem

A method of transmitting control signals to reduce control signaling is provided.

Technical Solution

In an aspect, a method of transmitting a control signal in wireless communication system. The method includes generating a multiplexed control signal by multiplexing a first control signal and a second control signal, and transmitting the multiplexed control signal on a control channel.

In another aspect, a method of transmitting a channel quality indicator (CQI) in a wireless communication system. The method includes generating a CQI, shifting a phase of the CQI so that the CQI is multiplexed with a radio resource allocation request and transmitting the phase-shifted CQI on a CQI channel.

In still another aspect, a method of transmitting a ACK/NACK signal in a wireless communication system. The method includes shifting a phase of the ACK/NACK signal so that the ACK/NACK signal is multiplexed with a radio resource allocation request, and transmitting the phase-shifted ACK/NACK signal on an ACK/NACK channel.

ADVANTAGEOUS EFFECTS

Overhead due to control signaling can be reduced by transmitting or receiving a multiplexed control signal through one channel.

MODE FOR THE INVENTION

Figure 1:
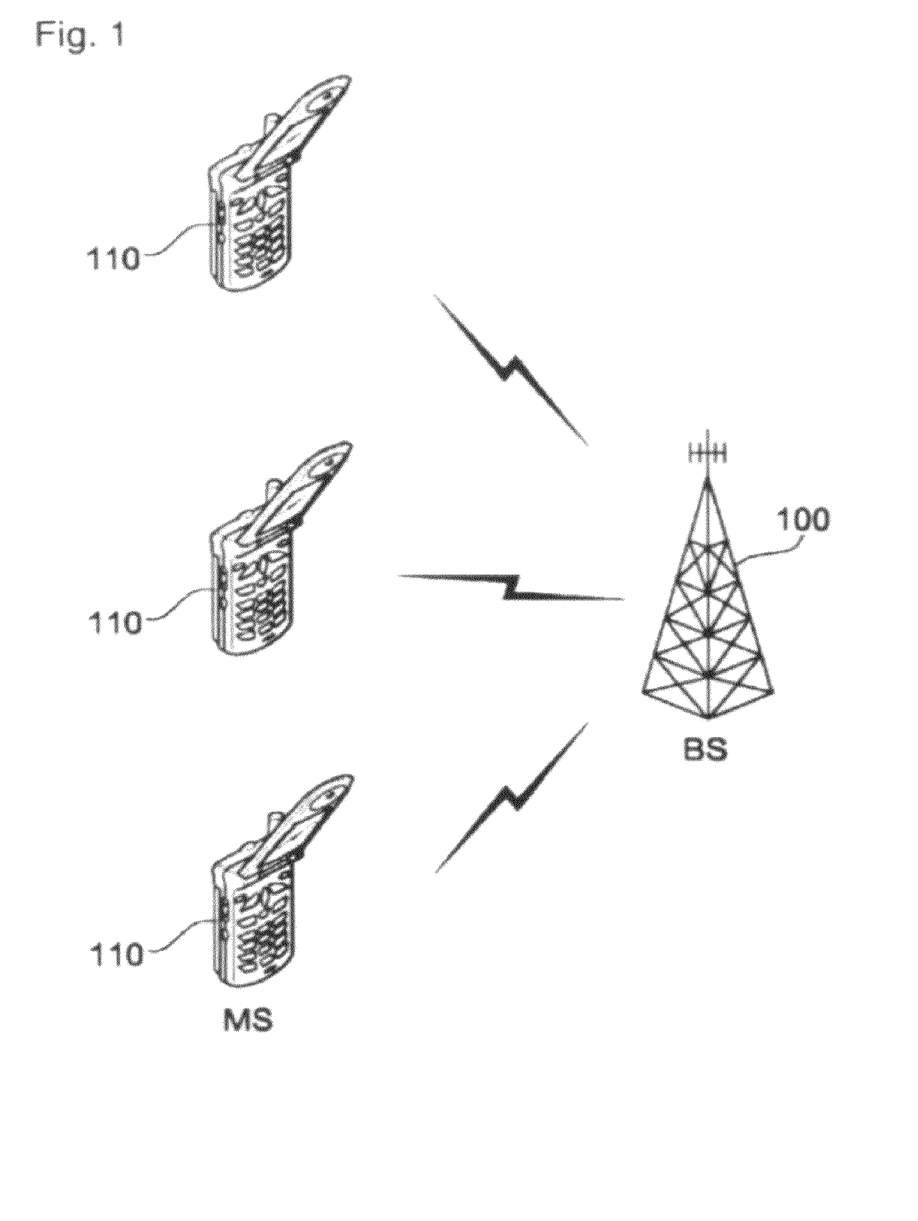
FIG. 1 is an exemplary view showing a wireless communication system.

FIG. 1 is an exemplary view showing a wireless communication system.

Referring to FIG. 1, a wireless communication system includes a base station (BS) 100, and a mobile station (MS) 110. The communication systems are widely deployed to provide a variety of communication services such as voice and packet data. The base station 100 generally refers to a fixed station communicating with the mobile station 110 and can also be referred to as another terminology, such as node-B, a base transceiver system (BTS) or an access point. The mobile station 110 can be fixed or mobile and can also be called another terminology, such as a user equipment (UE), a user terminal (UT), a subscriber station (SS) or a wireless device.

The base station 100 receives uplink data through a uplink channel. The uplink channel is a channel through which uplink data is transmitted. The uplink data includes control signals or user signals. The user signal refers to a signal to which user data is loaded and the control signal refers to signals other than user data. The control signal can include a CQI, feedback information such as ACK (Acknowledgement)/NACK (Not-Acknowledgement) signals, and scheduling information such as radio resource allocation, power level control, and synchronization information. Control information is necessary for successful transmission of user signals between the base station 100 and the mobile station 110. For example, the base station 100 receives a CQI from the mobile station 110 and can schedule the transmission format, the power level, the data rate, etc. of a user signal based on the received CQI. The base station 100 processes a user signal based on the scheduled transmission format, power level, data rate, and so on and transmits the user signal to the mobile station 110 through a downlink channel. The base station 100 allocates the best resources to the mobile station 110 based on the CQI, thereby increasing the data rate.

The mobile station 110 receives downlink data through the downlink channel. The downlink data includes control signals or user signals in a similar way as uplink data. The downlink data can include a pilot for CQI measurement or a preamble for synchronization. The pilot is a signal known to both the base station 100 and the mobile station 110 for channel estimation or data modulation and is also called a reference signal. The mobile station 110 measures a CQI through the pilot. The mobile station 110 reports a measured CQI to the base station 100.

A wireless communication system can be OFDM/OFDMA-based system. OFDM employs a plurality of orthogonal subcarriers. OFDM employs the orthogonality between inverse fast Fourier transform (IFFT) and fast Fourier transform (FFT). A transmitter performs IFFT on data and transmits the resulting data. A receiver performs FFT on a received signal and thus restores original data. A transmitter employs IFFT in order to combine a plurality of subcarriers. A receiver employs corresponding FFT in order to separate multiple subcarriers. Here, in the downlink, a transmitter can be a part of the base station 100 and a receiver can be a part of the mobile station 110. In the uplink, a transmitter can be a part of the mobile station 110 and a receiver can be a part of the base station 100.

Figure 2:
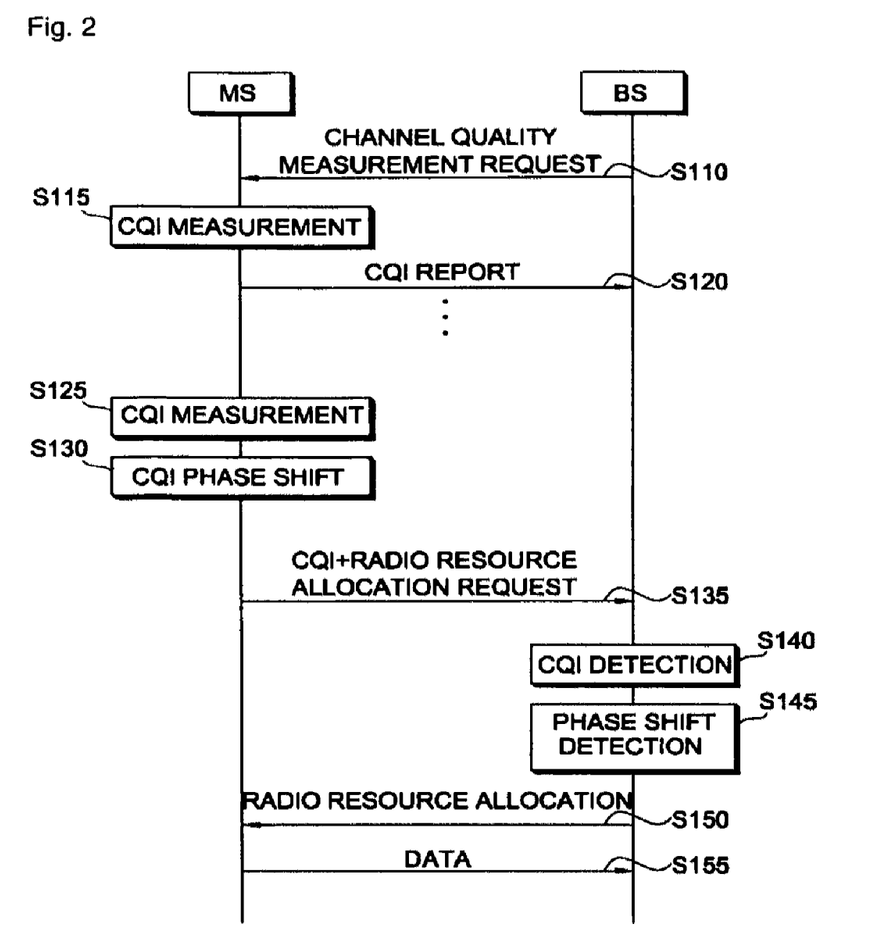
FIG. 2 is a flowchart illustrating a data transmission method in accordance with an embodiment of the present invention.

FIG. 2 is a flowchart illustrating a data transmission method in accordance with an embodiment of the present invention.

Referring to FIG. 2, a base station requests channel quality measurement to a mobile station (S110). This channel quality measurement request can be carried out through a channel quality measurement request message. The channel quality measurement request message can include information about a period of CQI report and uplink radio resources for CQI report and the like.

The mobile station measures channel quality and thus constructs a CQI (S115). The CQI can be measured through a pilot, which is included in downlink data transmitted from the base station. Here, the CQI refers to information informing a channel state between the mobile station and the base station. The CQI can have a variety of forms such as the signal-to-interference plus noise ratio (SINR), the modulation and coding scheme (MCS) level, a data rate indicator or a received signal strength indicator.

The mobile station reports the CQI to the base station through a CQI channel (S120). The CQI channel is a channel through which the CQI is transmitted. The mobile station periodically reports a CQI to the base station according to the CQI measurement period included in the channel quality measurement request message. In response to a command from the base station, the mobile station periodically measures a CQI and reports the measured CQI to the base station.

For another CQI report, the mobile station measures channel quality at a proper time in order to construct a CQI (S125).

In order to request radio resource allocation, the mobile station shifts the phase of the CQI (S130). The mobile station must be allocated uplink radio resources from the base station in order to transmit user signals through the uplink. While periodically reporting the CQI, the mobile station shifts the phase of the CQI and requests radio resource allocation from the base station. In other words, assuming that the CQI is a first control signal and the radio resource allocation request is a second control signal, the mobile station multiplexes the first control signal and the second control signal. The mobile station shifts the phase of the first control signal and multiplexes the second control signal with the first control signal. The phase-shifted first control signal becomes a multiplexed control signal. This multiplexing of control information is described later on.

The mobile station transmits the phase-shifted CQI through the CQI channel (S135). Although only the phase-shifted CQI is transmitted through the CQI channel, it can be seen that two control signals are transmitted through the CQI channel. The CQI channel carries an actual CQI value and radio resource allocation request information based on the phase-shifted CQI.

The base station detects a CQI from the CQI channel (S140). A scheme for detecting a CQI from the CQI channel may employ a coherent detection or non-coherent detection scheme. The coherent detection scheme is a method of performing channel estimation using a pilot and then detecting a CQI. The non-coherent detection scheme is a method of detecting a CQI without channel estimation. Additionally, a variety of schemes for detecting a CQI may be employed.

The base station detects whether the phase of a CQI has shifted (S145). If, as a result of the detection, the phase of the CQI has shifted, the base station determines that there is a radio resource allocation request from the mobile station. The detection of the phase shift may be varied depending on coherent detection and non-coherent detection, which is described later on.

The base station allocates radio resources to the mobile station according to the radio resource allocation request (S150).

The mobile station which received an allocation of radio resources transmits uplink data using the radio resources (S155).

The mobile station transmits the phase-shifted CQI comprising radio resource allocation request information through the CQI channel which carries CQIs periodically. This method makes unnecessary an additional control channel regarding a radio resource allocation request. Accordingly, control signaling can be reduced.

Multiplexing of control signals and detection of a multiplexed control signal are described below.

Figure 3:
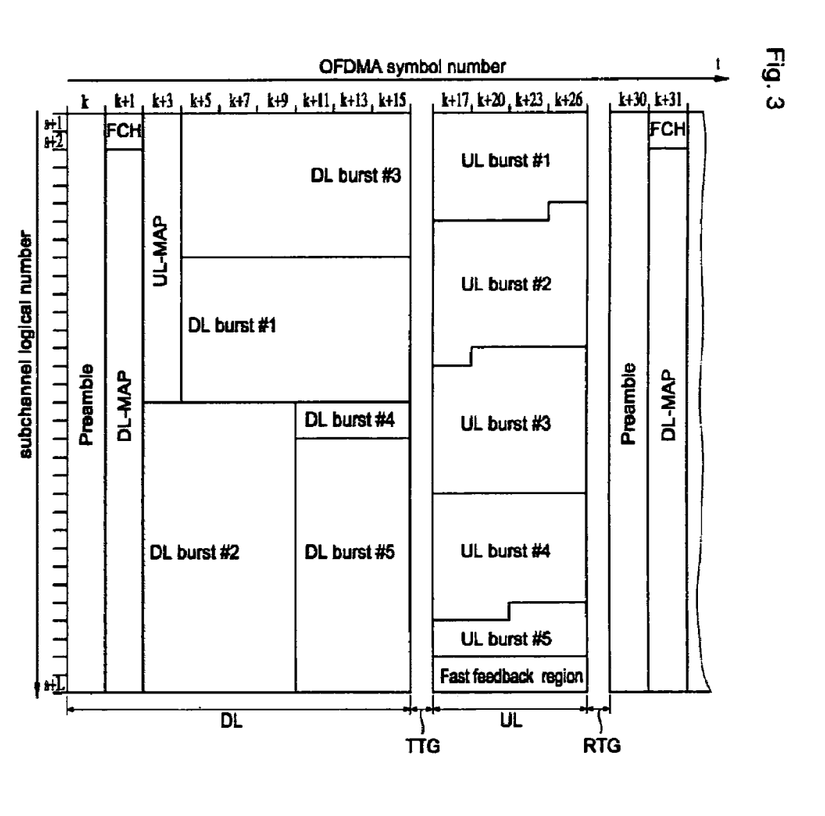
FIG. 3 shows an example of a frame configuration.

FIG. 3 shows an example of a frame configuration. A frame is a data sequence during a fixed time, which is used by physical specifications. This may be an OFDMA frame.

Referring to FIG. 3, a frame includes a downlink frame and an uplink frame. Time division duplex is a scheme in which uplink and downlink transmissions share the same frequency, but occur on different times. The downlink frame is earlier in time than the uplink frame. The downlink frame includes a preamble, a frame control header (FCH), a downlink (DL)-MAP, an uplink (UL)-MAP, and a downlink burst (DL burst) region. The uplink frame includes an uplink burst (UL burst) region.

A guard time for separating an uplink frame and a downlink frame is inserted into an intermediate portion of a frame (between the downlink frame and the uplink frame) and the last portion of the frame (subsequently to the uplink frame). A transmit/receive transition gap (TTG) is a gap between a downlink burst and a subsequent uplink burst. A receive/transmit transition gap (RTG) is a gap between an uplink burst and a subsequent downlink burst.

The preamble is used for initial sync, cell search, frequency offset, and channel estimation between a base station and a mobile station. The FCH includes information about the length of a DL-MAP message and a coding scheme of DL-MAP. The DL-MAP is a region where a DL-MAP message is transmitted. The DL-MAP message defines access to a downlink channel. The DL-MAP message includes a configuration change count of a downlink channel descriptor (DCD) and a base station identifier (ID). The DCD describes a downlink burst profile applied to a current MAP. The downlink burst profile refers to the characteristic of a downlink PHY channel. The DCD is periodically transmitted by a base station through the DCD message. The UL-MAP is a region where a UL-MAP message is transmitted. The UL-MAP message defines access to an uplink channel. The UL-MAP message includes a configuration change count of an uplink channel descriptor (UCD) and a valid start time of uplink assignment, which is defined by the UL-MAP. The UCD describes an uplink burst profile. The uplink burst profile refers to the characteristic of an uplink PHY channel. The UCD is periodically transmitted by a base station through the UCD message.

In part of a uplink frame is included a fast feedback region. The fast feedback region is a region allocated for faster uplink transmission than transmission of general uplink data and can have a CQI, ACK/NACK signals, etc. loaded thereon. The fast feedback region may be placed anywhere in a uplink frame, but is not limited to an illustrated location or size.

Hereinafter, a slot is a minimum possible data allocation unit and is defined by the time and subchannel. In the uplink, a subchannel can be constructed of a plurality of tiles. The subchannel is constructed of six tiles. In the uplink, one burst can be constructed of three OFDM symbols and one subchannel. In partial usage of subchannel (PUSC) permutation, each tile can include four contiguous subcarriers on three OFDM symbols. In optional PUSC permutation, each tile can include three contiguous subcarriers on three OFDM symbols. Tiles included in the subchannel are distributed and disposed over the entire bands. A bin includes nine contiguous subcarriers on the OFDM symbol. A band refers to a group of four rows of bins and an adaptive modulation and coding (AMC) subchannel is constructed of six contiguous bins in the same band.

Figure 4:
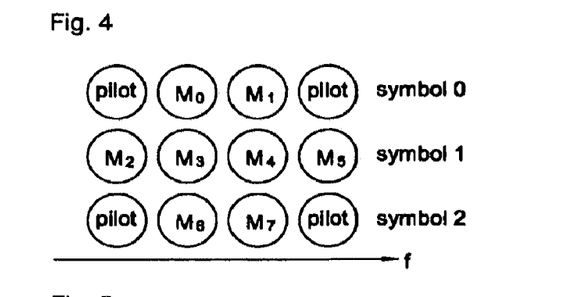
FIG. 4 shows an example of a tile, which is a tile in PUSC.

FIG. 4 shows an example of a tile, which is a tile in PUSC.

Referring to FIG. 4, one tile is constructed of four subcarriers in frequency domain and three OFDM symbols (symbols 0 to symbol 2) in time domain, resulting in a total of twelve subcarriers. The twelve subcarriers can be divided into eight data subcarriers $M_0, \ldots, M_7$ and four pilot subcarriers.

Figure 5:
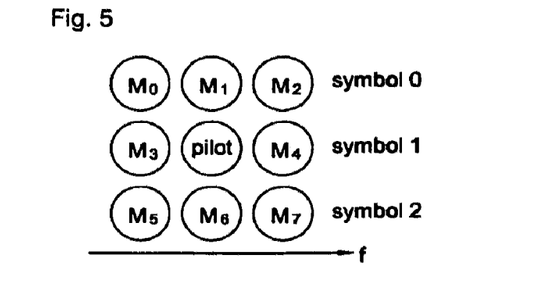
FIG. 5 shows another example of a tile, which is a tile in optional PUSC.

FIG. 5 shows another example of a tile, which is a tile in optional PUSC.

Referring to FIG. 5, one tile is constructed of three subcarriers in frequency domain and three OFDM symbols (symbol 0 to symbol 2) in time domain, resulting in a total of nine subcarriers. The nine subcarriers can be divided into eight data subcarriers $M_0, \ldots, M_7$ and one pilot subcarrier.

Figure 6:
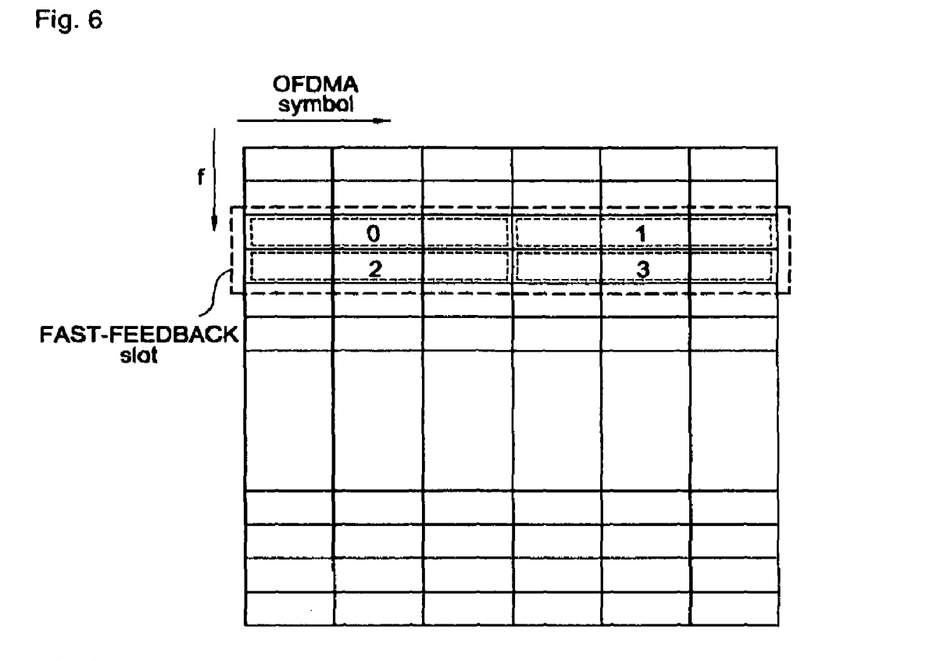
FIG. 6 shows an example of a fast feedback region shown in FIG. 3.

FIG. 6 shows an example of the fast feedback region shown in FIG. 3.

Referring to FIG. 6, Fast feedback message is mapped to the fast feedback region. One fast feedback message can occupy one fast feedback slot. This drawing illustrates that four subchannels are allocated to one fast feedback slot.

One subchannel can include a plurality of tiles. In order to clarity description, it is assumed that one subchannel includes six tiles. When one tile is constructed of PUSC, that is, the form of FIG. 4, one subchannel includes 48 data subcarriers and 24 pilot subcarriers. When one tile includes optional PUSC, that is, the form of FIG. 5, one subchannel includes 48 data subcarriers and six pilot subcarriers.

A method of transmitting the CQI through the fast feedback slot is described below. In order to clarity description, it is assumed that one of the four subchannels constituting the fast feedback slot is allocated to one CQI channel.

In an embodiment, the CQI can be mapped to the data subcarrier of each tile. Table 1 lists modulation symbols assigned to eight data subcarriers included in one tile. The modulation symbol is modulated to one subcarrier, and eight modulation symbols assigned to one tile constitute one vector. A total of eight types of the vectors are constructed and indices thereof have the values of 0 to 7.

TABLE 1

| Vector index | Data subcarrier modulation per Codeword-Subcarrier(0), Subcarrier(1), ... Subcarrier(7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where the modulation symbols constituting each vector is expressed in the following equation 1.

MathFigure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

At this time, the vectors having different indices are orthogonal to each other.

Assuming that a payload indicating the CQI is 4 bits, the vectors assigned to the CQI channel can be expressed in the following Table 2.

TABLE 2

| 4 bit payload | Fast-feedback vector indices per Tile Tile(0), Tile(1), ..., Tile(5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |

TABLE 2-continued

| 4 bit payload | Fast-feedback vector indices per TileTile(0), Tile(1), ..., Tile(5) |
|---|---|
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, 0, 1, 2, 3, 4 |

One CQI channel includes six tiles because one subchannel is allocated to the CQI channel. Six vectors are necessary to represent the CQI because one vector is assigned to one tile. A CQI, which is mapped to a subchannel and represented in the vector form, is called the codeword of the CQI. Table 2 illustrates an example of a combination of vectors per payload. However, there is no limit to the combination of the vectors, which can be easily modified by those having ordinary skill in the art.

For example, it is assumed that the CQI value is 3. If it sought to represent 3 as 4 bits, 3 becomes 'b0010 ' In Table 2, the vector index of 'b0010 ' is {2,2,2,2,2,2}. A mobile station modulates the vectors of the index 2 of Table 1 to the data subcarriers, included in six tiles constituting one subchannel, respectively, and transmits the modulated subcarriers to a base station through a fast feedback slot. The base station extracts the vectors from the fast feedback slot and obtains vector indices. The bit representation '0b0010 ' of a corresponding CQI can be found from the obtained vector indices in a reverse manner. A pilot or a null symbol may be assigned to the pilot subcarrier included in the tile.

However, the combination of the vectors per index of Table 1 and the vectors depending on the CQI values of Table 2 is only illustrative. Those having ordinary skill in the art can arbitrarily decide the number of the vector indices or the size of the payload.

In another embodiment, the CQI can be mapped to pilot subcarriers of a tile. Table 3 illustrates four modulation symbols assigned to one tile (Referring to FIG. 4, there are four pilot subcarriers in one tile in PUSC). The four modulation symbols assigned to one tile constitute one vector and four types of vectors can be constructed.

TABLE 3

| Vector index | $M_{n, 4m}, M_{n, 4m+1}, M_{n, 4m+2}, M_{n, 4m+3}$ |
|---|---|
| 0 | P0, P0, P0, P0 |
| 1 | P0, P2, P0, P2 |
| 2 | P0, P1, P2, P3 |
| 3 | P1, P0, P3, P2 |

The modulation symbols P0, P1, P2, and P3 constituting the respective vectors are expressed in the above Equation 1.

Assuming that the payload for a CQI is 4 bits, the vectors assigned to the CQI channel can be expressed in the following Table 4.

TABLE 4

| Four-bit payload(binary) | Vector indices per tileTile(0), Tile(1), Tile(2), Tile(3), Tile(4), Tile(5) |
|---|---|
| 0000 | 0, 0, 0, 1, 1, 1 |
| 0001 | 1, 1, 1, 0, 0, 0 |
| 0010 | 2, 2, 2, 3, 3, 3 |
| 0011 | 3, 3, 3, 2, 2, 2 |
| 0100 | 0, 1, 2, 3, 0, 1 |
| 0101 | 1, 2, 3, 0, 1, 3 |
| 0110 | 2, 3, 0, 1, 2, 3 |
| 0111 | 3, 0, 1, 2, 3, 0 |
| 1000 | 0, 0, 1, 3, 2, 2 |
| 1001 | 1, 3, 2, 2, 3, 1 |
| 1100 | 2, 2, 3, 1, 0, 0 |
| 1110 | 3, 3, 1, 0, 1, 1 |
| 1100 | 0, 0, 3, 2, 0, 3 |
| 1101 | 1, 2, 0, 2, 2, 0 |
| 1110 | 2, 1, 3, 3, 1, 2 |
| 1111 | 3, 2, 2, 1, 1, 2 |

The CQI channel is assigned to one subchannel, so one CQI channel includes six tiles. One vector is assigned to one tile and therefore six vectors are necessary to represent the CQI.

In still another example, the CQI can be mapped to both the data subcarriers and the pilot subcarriers in each tile. That is, Table 2 shows an example in which the CQI is mapped to the data subcarriers of the tile, and Table 4 shows an example in which the CQI is mapped to the pilot subcarriers of the tile. However, the CQI can be mapped to both the data subcarriers and the pilot subcarriers.

As described above, the CQI channel can be assigned to the fast feedback channel and then carries CQIs. Phase shift of the CQI is now described.

The modulation symbols constituting the vectors for representing the CQI is shown in Equation 1. In order to shift the phase of the CQI, each modulation symbol is multiplied by the phase shift value. This can be expressed in the following equation 2.

MathFigure 2

$$P0_{ps}=P0e^{j\theta}, P1_{ps}=P1e^{j\theta}$$

$$P2_{ps}=P2e^{j\theta}, P3_{ps}=P3e^{j\theta} \qquad [\text{Math.2}]$$

where θ is the phase shift value. For example, in order to shift the phase of a CQI as much as the phase shift value θ=π/4, each modulation symbol is multiplied by exp(jπ/4).

When the mobile station wants a radio resource allocation request, the mobile station constructs a CQI by multiplying a modulation symbol by a phase shift value and then transmits the constructed CQI through the CQI channel. Assuming that the codeword of a CQI is $C_0$ and phase shift is E, a receiving signal y received by a base station can be expressed in the following Equation 3 when disregarding noise.

MathFigure 3

$$y=HC_0E \qquad [\text{Math.3}]$$

where H is the channel.

In coherent detection, respective tiles are distributed over the entire bands. The base station can obtain the value of a channel H through channel estimation. When compensating for the channel H in the receiving signal y, $C_0E$ can be found. Assuming that the payload of a CQI is 4 bits, a total of 16 types of codewords exist. If the correlation values for all the 16 types of codewords is found, a codeword having the highest correlation value can be found, which becomes $C_0$. This is because vectors with different indices are orthogonal to each other and the orthogonality remains intact although the same phase shift value is used. Since E can be found through $C_0$, the base station can detect whether phase shift exists from a receiving signal. If phase shift exists in a CQI, the base station can find that the mobile station having transmitted a corresponding CQI requests radio resources.

In non-coherent detection, the base station does not perform channel estimation and therefore does not know the value of the channel H. However, it can be seen that one tile is not large in size on the time and frequency and a channel change within one tile is constant. Eight kinds of vectors can be mapped to one tile as listed in Table 1. Thus, an index of a vector having the highest correlation value can be found by correlating respective vectors. In this manner, the indices of six vectors having the highest correlation values can be found sequentially with respect to the six tiles constituting a subchannel. The closest codeword $C_0$ can be found by comparing the sequence of the indices of the six vectors to the sequence of Table 2. Consequently, a CQI can be detected. If $C_0$ is found, whether the phase of the CQI has been shifted can be detected. If there is a phase shift in the CQI, the base station can find that the mobile station having transmitted a corresponding CQI requests radio resources. In addition to the above detection methods, other coherent and non-coherent detection methods may exist.

The process of allowing the mobile station to request the base station to allocate radio resources is a pre-step for performing uplink transmission. This process is performed through a random access process in UMTS (Universal Mobile Telecommunications System) and is performed through a ranging process in IEEE (Institute of Electrical and Electronics Engineers) 802.16 standard. The random access process and the ranging process are a contention-based process.

The random access process is described as an example. In order to be allocated uplink radio resources, a mobile station selects one access slot and one signature and transmits a preamble to through the uplink. The preamble can be transmitted during an access slot section of 1.33 ms in length. During a first specific length of the access slot, one of 16 kinds of signatures can be selected and then transmitted. If the mobile station transmits the preamble, a base station transmits a signature selected by the preamble during the first specific length of the access slot, which corresponds to the access slot during which the preamble has been transmitted, in response thereto. If a response to the transmitted preamble is not received, the mobile station transmits a new preamble using power, which is higher one step than that of a previous preamble after a predetermined access slot. If a plurality of user equipments perform the random access process at the same time, they can select and send the same signature. Thus, this process is called the contention-based process.

The ranging process is described as an example. A mobile station sends a ranging request message including a CDMA code. A mobile station arbitrarily selects a ranging slot within a backoff window included in a UCD and selects the CDMA code from a series of allowed codes. A pseudo-random bit sequence (PRBS) binary phase shift keying (BPSK) code can be used as the CDMA code. For example, the CDMA codes may be 288 in number, a part of which is used for a bandwidth allocation request. The 288 CDMA codes are trisected; the first codes can be used for initial ranging for the purpose of timing offset and power level control upon initial access, the second codes can be used for periodical ranging for the purpose of periodical power level control, and the third codes can be used for a radio resource allocation request. Mobile stations that transmit ranging request messages through the same ranging slot on the same time are in a contention state. The base station sends a ranging response message in response to the ranging request message.

The random access process or the ranging process is a contention-based process. Hence, a probability that the mobile station will succeed in the contention at once is not high. If the mobile station transmits messages several times, overhead of control signaling is increased. Thus, if the radio resource allocation request is transmitted through the CQI channel that periodically carries CQIs, the consumption of radio resources can be prevented without the loss of the CQI channel. Further, a base station can directly determine a mobile station that has requested radio resource allocation, so there is no contention. The power of a mobile station can also be saved because it is not necessary to send a plurality of random access requests or ranging requests.

Figure 7:
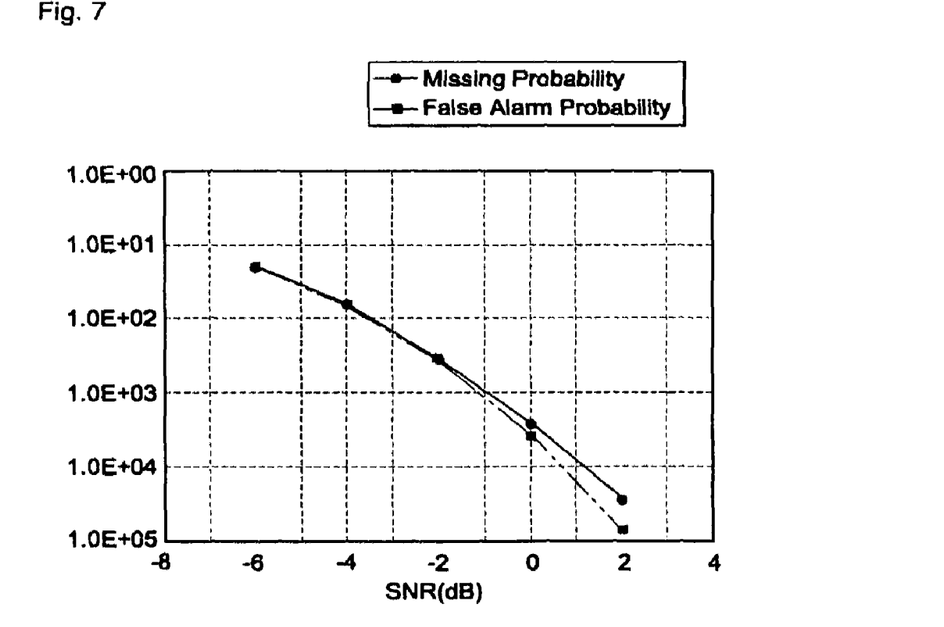
FIG. 7 is a graph showing the simulation results regarding a radio resource allocation request using a phase shift of a CQI.

FIG. 7 is a graph showing the simulation results regarding a radio resource allocation request using a phase shift of a CQI. A missing probability is a probability that a mobile station makes a radio resource allocation request using phase shift of a CQI, but a base station does not notice the radio resource allocation request. A false alarm probability is a probability that a mobile station doesn't make a radio resource allocation request, but a base station determines that there is a radio resource allocation request.

Referring to FIG. 7, the higher SNR, and the lower the missing probability and the false alarm probability. Further, the missing probability and the false alarm probability are low as a whole. Thus, It is determined that a base station can recognize a radio resource allocation request successfully although a mobile station transmits a radio resource allocation request using phase shift of a CQI.

Figure 8:
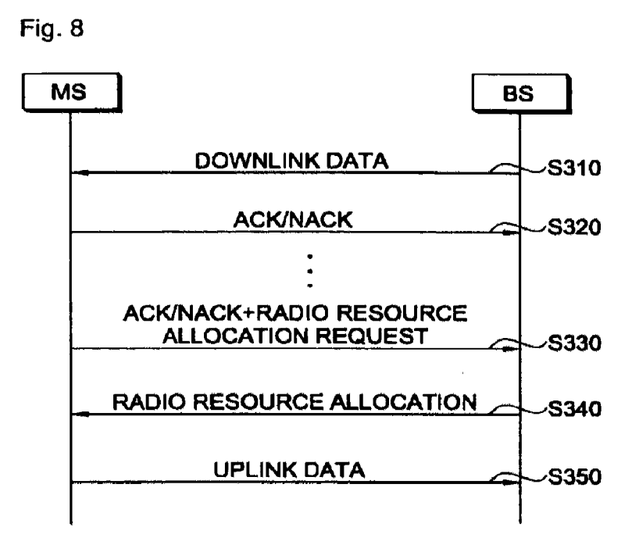
FIG. 8 is a flowchart illustrating a data transmission method in accordance with another embodiment of the present invention.

FIG. 8 is a flowchart illustrating a data transmission method in accordance with another embodiment of the present invention. This illustrates a data transmission method using a hybrid automatic repeat request (HARQ) scheme.

Referring to FIG. 8, a base station sends downlink data (S310). A mobile station receives the downlink data and decodes the data in order to detect error. The mobile station sends an ACK (Acknowledgement) signal when error is not detected, but sends an NACK (Not-Acknowledgement) signal when error is detected (S320). A channel through which the ACK/NACK signals are transmitted is called an ACK/NACK channel. The ACK/NACK channel can be assigned a 1/2 subchannel.

Table 5 lists eight modulation symbols assigned to one tile used in the ACK/NACK channel. Eight modulation symbols assigned to one tile constitute one vector. Eight kinds of vectors can be constituted.

TABLE 5

| Vector index | $M_{n,\,m8}, M_{n,\,8m+1}, \ldots M_{n,\,8m+7}$ |
|---|---|
| 0 | P0, P1, P2, P3, P0, P1, P2, P3 |
| 1 | P0, P3, P2, P1 ,P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

The modulation symbol P0, P1, P2, and P3 constituting the respective vectors are expressed in Equation 1.

Assuming that a payload for ACK/NACK is 1 bit (for example, when the bit is 0, it is ACK, but when the bit is 1, it is NACK), the vectors assigned to the ACK/NACK channel can be expressed in the following Table 6. The ACK/NACK channel is assigned a 1/2 subchannel and, therefore, one ACK/NACK channel includes three tiles. Since one vector is assigned to one tile, three vectors are required to represent ACK/NACK.

TABLE 6

| ACK 1-bit symbol | Vector indices per TileTile(0), Tile(1), Tile(2) |
|---|---|
| 0 | 0, 0, 0 |
| 1 | 4, 7, 2 |

If an ACK signal is received in response to the downlink data, the base station transmits next downlink data. However, if a NACK signal is received, the base station retransmits retransmission data. The retransmission data can be identical to or different from the original downlink data depending on the HARQ scheme. The base station can attempt retransmission during a predetermined number of times.

In order to request radio resource allocation, the mobile station shifts the phase of the ACK/NACK signal and transmits the phase shifted signals to the base station through the ACK/NACK channel (S330). In order to transmit a user signal on the uplink, the mobile station must be allocated uplink radio resources from the base station. When transmitting the ACK/NACK signal, the mobile station shifts the phases of the ACK/NACK signal and multiplexes radio resource allocation requests.

In other words, assuming that the ACK/NACK signal is a first control signal and the radio resource allocation request is a second control signal, the mobile station multiplexes the first control signal and the second control signal. The ACK/NACK channel carries an actual ACK/NACK value and radio resource allocation request information using the phase-shifted ACK/NACK signal.

This multiplexing of the ACK/NACK signal and the radio resource allocation request is described in more detail below. In the ACK/NACK signal, ACK and NACK can be represented in various ways. A signal in which radio resource allocation requests are multiplexed can be represented in various ways according to the representation of ACK and NACK.

Table 7 illustrates an example of a method of transmitting the ACK/NACK signal and the radio resource allocation request.

TABLE 7

| | ACK | NACK |
|---|---|---|
| No Bandwidth request | Null | Data + Pilot |
| MultiplexingBandwidth request | Pilot only | −Data + Pilot |

In the case where the radio resource allocation request is not multiplexed in the ACK/NACK signal (No Bandwidth request), the Null signal is transmitted for ACK, and the data and the pilot are transmitted for NACK. Since the occurrence ratio of ACK is higher than that of NACK, a mobile station does not transmit any signal for ACK, but only transmits signals for NACK, so interference signals can be minimized. On the contrary, a mobile station may transmit signals only for ACK, but may not transmit any signal for NACK.

In the case where the radio resource allocation request is multiplexed in the ACK/NACK signal (Multiplexing Bandwidth request), only the pilot is transmitted for ACK, and the phase-shifted data and not-phase-shifted pilot is transmitted for NACK. That is, for ACK, the null symbol is mapped on the data subcarrier of the ACK/NACK channel and the pilot is mapped on the pilot subcarrier. However, for NACK, the phase-shifted modulation symbol is mapped on the data subcarrier of the ACK/NACK channel and transmitted, and the not-phase-shifted pilot is mapped on the pilot subcarrier and transmitted. The data can be phase-shifted according to the Equation 2 and transmitted. Here, although the data has been phase-shifted by 180 degrees, there is no limit to the phase shift value.

Table 8 illustrates another example of a method of transmitting the ACK/NACK signal and the radio resource allocation request.

TABLE 8

| | ACK | NACK |
|---|---|---|
| No Bandwidth request | Data + Pilot | −Data + Pilot |
| MultiplexingBandwidth request | j Data + Pilot | −j Data + Pilot |

In the case where the radio resource allocation request is not multiplexed in the ACK/NACK signal (No Bandwidth request), the data and the pilot are transmitted without change for ACK, and the phase-shifted data and the not-phase-shifted pilot are transmitted for NACK. That is, ACK and NACK use the same codeword and can be classified through the phase of the codeword. On the contrary, the phase-shifted data may be transmitted for ACK and the data may be transmitted without change for NACK.

In the case where the radio resource allocation request is multiplexed in the ACK/NACK signal (Multiplexing Bandwidth request), the j phase-shifted data and the not-phase-shifted pilot are transmitted for ACK, and the −j phase-shifted data the not-phase-shifted pilot is transmitted for NACK. Here, it has been described that the first phase shift value(−1) to classify ACK and NACK is 180 degrees and the second phase shift value(j) to indicate the multiplexing of the radio resource allocation request is −90 degrees. However, the first phase shift and the second phase shift may have the same value depending on a modulation method or the phase shift value.

Table 9 illustrates still another example of a method of transmitting the ACK/NACK signal and the radio resource allocation request.

TABLE 9

| | ACK | NACK |
|---|---|---|
| No Bandwidth request | Data 1 + Pilot | Data 2 + Pilot |
| MultiplexingBandwidth request | −Data 1 + Pilot | −Data 2 + Pilot |

In the case where the radio resource allocation request is not multiplexed in the ACK/NACK signal (No Bandwidth request), the first data and the pilot are transmitted for ACK, and the second data and the pilot are transmitted for NACK. The first data and the second data can be orthogonal to each other. As listed in Table 6, the first data and the second data can be classified using different codewords.

In the case where the radio resource allocation request is multiplexed in the ACK/NACK signal (Multiplexing Bandwidth request), the first data is phase-shifted and transmitted and the pilot is transmitted without changed for ACK, and the second data is phase-shifted and transmitted and the pilot is transmitted without change for NACK. Here, it has been described that the phase shift value of each of the first data and the second data is 180 degrees, but the phase shift value is not limited thereto.

As described above, when the phase of the ACK/NACK signal is shifted to multiplex radio resource allocation request, only the phase of data is shifted, but the phase of a pilot is not shifted. Accordingly, phase shift due to fading, which may occur in the transmission process of a signal, can be detected on the basis of a pilot. The pilot is a signal known to both a base station and a mobile station. Thus, it can be seen that if the phase of the pilot is shifted in the transmission process, the phase of the ACK/NACK signal has been entirely shifted. Accordingly, mistaken acknowledgement of the ACK/NACK signal due to fading can be prevented.

For example, it is assumed that when multiplexing the ACK/NACK signal and the radio resource allocation request, the pilot is also phase-shifted. If a mobile station has sent NACK, but a 180-degree phase shift has been occurred due to fading in a transmission process, a base station can misrecognize a received signal as ACK in the case of Table 8 and can misrecognize the received signal as a signal in which NACK and the radio resource allocation request are multiplexed in the case of Tables 7 and 9. Thus, the base station can erroneously allocate radio resources to the mobile station. Consequently, radio resources are unnecessarily allocated due to misrecognition of the signal.

However, if the phase of a pilot remains intact without shifting the phase of the pilot when multiplexing the ACK/NACK signal and the radio resource allocation request as in the proposed method, the base station can detect a phase shift value due to fading based on the pilot although a phase shift occurs in a transmission process. therefore, the base station can detect an accurate phase shift value of the received signal.

Thus, in the case where a plurality of control signals are multiplexed using a phase shift, error which may occur in a transmission process can be prevented using a method of not shifting the phase of a pilot. This method can also be applied to a case where the CQI and the radio resource allocation request are multiplexed and a case where different control signals are multiplexed.

Table 10 illustrates further still another example of a method of transmitting the ACK/NACK signal and the radio resource allocation request.

TABLE 10

| ACK 2-bit symbol | Vector indices per Tile |
|---|---|
| ACK | 0, 0, 0 |
| NACK | 4, 7, 2 |
| ACK + BW request | 1, 3, 5 |
| NACK + BW request | 2, 4, 6 |

A case where only ACK is transmitted, only NACK is transmitted, a case where ACK and a radio resource allocation request are multiplexed and transmitted (ACK+BW request), and a case where NACK and a radio resource allocation request are multiplexed and transmitted (NACK+BW request) can be represented by 2 bits. A codeword for each of the four kinds can be produced. The four codewords can be constructed of different vector indices as in Table 10. Modulation symbols for the vector indices can employ Table 5. The codewords of Table 10 are only illustrative. The codewords can be arranged so that the vectors between the codewords are not overlapped with each other and, therefore, a variety of codewords can be constructed so that a distance between the codewords is not changed. There is no limit to multiple control signals represented by codewords that are constructed in various ways.

The base station detects the ACK/NACK signal from the ACK/NACK channel and the radio resource allocation request, and allocates radio resources to the mobile station (S340). The mobile station to which the radio resources are allocated transmits uplink data using the radio resources (S350).

The phase of the ACK/NACK signal transmitted through the ACK/NACK channel is shifted in order to multiplex the radio resource allocation request. Accordingly, a control channel for an additional radio resource allocation request is not required. Thus, control signaling can be reduced.

Although the downlink HARQ scheme has been described above, the technical spirit of the present invention can also be applied to the uplink HARQ scheme without change.

It has been described that the CQI and the radio resource allocation request are multiplexed to the CQI channel and the ACK/NACK signal and the radio resource allocation request are multiplexed to the ACK/NACK channel. However, this is only illustrative and a plurality of control signals can be multiplexed and transmitted through one channel. For example, the CQI and the ACK/NACK signal can be multiplexed. Alternatively, the radio resource allocation request can be multiplexed to multiple input multiple output (MIMO) feedback information.

Various kinds of control signals can be multiplexed by using different phase shift values. For example, when a phase shift is four steps, a 2-bit control signal can be multiplexed.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting a channel quality indicator (CQI) in a wireless communication system, the method comprising:

measuring a CQI;

modulating the CQI to modulation symbols, the CQI corresponding to a plurality of vector indices, each vector index indicating a vector including a plurality of modulation symbols, each modulation symbol being assigned to one subcarrier in a fast feedback channel;

shifting a phase of the CQI by multiplying a phase shift value to each modulation symbol so that the CQI is multiplexed with a radio resource allocation request; and transmitting the phase-shifted CQI on the fast feedback channel, wherein each modulation symbol is one of P0, P1, P2, and P3 in the equation below:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right), \text{ and}$$

wherein the phase-shifted CQI is represented by the equation below:

$P0_{ps}=P0e^{j\theta}, P1_{ps}=P1e^{j\theta},$ $P2_{ps}=P2e^{j\theta}, P3_{ps}=P3e^{j\theta},$ where θ is the phase shift value.

2. The method of claim 1, wherein the phase-shifted CQI is transmitted periodically.

3. The method of claim 1, wherein the fast feedback channel is mapped to a subchannel including a plurality of tiles, and each tile is composed of data subcarriers and at least one pilot subcarrier.

4. The method of claim 3, wherein the CQI is carried by the data subcarriers.

5. The method of claim 3, wherein a number of the plurality of vector indices is equal to a number of the plurality of tiles.

6. The method of claim 1, wherein the θ is π/4.

7. The method of claim 1, wherein the vectors having different vector indices are orthogonal to each other.

8. A method of detecting, by a base station, a channel quality indicator (CQI) and a resource allocation request in a wireless communication system, the method comprising:
receiving the CQI from a user equipment;
detecting the resource allocation request from the CQI by detecting whether a phase of the CQI is shifted or not;
allocating radio resources to the user equipment based on the resource allocation request if the resource allocation request is detected; and
receiving uplink data from the user equipment through the allocated radio resources,
wherein the CQI is modulated to modulation symbols, the CQI corresponding to a plurality of vector indices, each vector index indicating a vector including a plurality of modulation symbols, each modulation symbol being assigned to one subcarrier in a fast feedback channel,
wherein the phase of the CQI is shifted by multiplying a phase shift value to each modulation symbol so that the CQI is multiplexed with the radio resource allocation request,
wherein each modulation symbol is one of P0, P1, P2, and P3 in the equation below:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right), \text{ and}$$

wherein the phase-shifted CQI is represented by the equation below:

$P0_{ps}=P0e^{j\theta}, P1_{ps}=P1e^{j\theta},$ $P2_{ps}=P2e^{j\theta}, P3_{ps}=P3e^{j\theta},$ where θ is the phase shift value.

9. The method of claim 8, wherein the CQI is received periodically.

10. The method of claim 8, wherein the fast feedback channel is mapped to a subchannel including a plurality of tiles, and each tile is composed of data subcarriers and at least one pilot subcarrier.

11. The method of claim 10, wherein the CQI is carried by the data subcarriers.

12. The method of claim 8, wherein the 0 is π/4.

13. The method of claim 8, wherein the vectors having different vector indices are orthogonal to each other.

* * * * *